United States Patent
Stark

[19]

[11] Patent Number: 6,024,111
[45] Date of Patent: Feb. 15, 2000

[54] PROCESS FOR HYDRAULIC TRANSPORT OF BULK MATERIAL

[75] Inventor: Bernhard Stark, Fronreute, Germany

[73] Assignee: Waeschle GmbH, Weingarten, Germany

[21] Appl. No.: 09/209,231

[22] Filed: Dec. 10, 1998

[30] Foreign Application Priority Data

Dec. 15, 1997 [DE] Germany .......................... 197 55 733

[51] Int. Cl.$^7$ ...................................................... G05D 7/00
[52] U.S. Cl. .................................... 137/4; 137/1; 137/92
[58] Field of Search ..................... 137/1, 4, 92

[56] References Cited

FOREIGN PATENT DOCUMENTS

| | | |
|---|---|---|
| 0 194 498 B1 | 7/1989 | European Pat. Off. |
| 26 08 673 C2 | 2/1977 | Germany . |
| 26 34 807 C2 | 11/1977 | Germany . |
| 32 10 657 C2 | 12/1982 | Germany . |

OTHER PUBLICATIONS

Dissertation, entitled Hydraulische Förderung von Eis zum Kühlen von Bergwerken, Technical University of Hannover, 1991, pp. 74–77.

*Primary Examiner*—Gerald A. Michalsky
*Attorney, Agent, or Firm*—Henry M. Feiereisen

[57] ABSTRACT

In a process for hydraulic transport of bulk material from a receiving site to a remote location via a conveying pipeline, a dispersion is prepared from bulk material and a liquid, and conducted into a feed pump which has a pressure side in communication with the entry into conveying pipeline, whereby a fraction of the liquid is withdrawn at a location between the pump and the entry into the conveying pipeline. Suitably, either the volume flow of the withdrawn fraction of the liquid represents a manipulated variable which is changed in dependence on a controlled variable constituted by the volume flow through or pressure in the conveying pipeline, or/and the dispersion is produced upstream of the feed pump from a controllable bulk material stream and controllable liquid amount, whereby the amount of liquid may also include at least a fraction of the liquid withdrawn from the pressure side of the feed pump.

17 Claims, 8 Drawing Sheets

PROCESS FOR HYDRAULIC TRANSPORT OF BULK MATERIAL

CROSS-REFERENCES TO RELATED APPLICATIONS

This application claims the priority of German Patent Application, Serial No 197 55 733.3, filed Dec. 15, 1997.

BACKGROUND OF THE INVENTION

The present invention generally relates to a process for hydraulic transport of bulk material from a receiving site to a remote location.

The dissertation, entitled "Hydraulische Forderung von Eis zum Kühlen von Bergwerken", and issued by the Technical University of Hannover, 1991, discloses a test plant for hydraulically conveying a mixture of ice and water. The test plant includes essentially a closed ring-shaped pipeline which is supplied from a vacuum-ice machine with a dispersion of ice and water, whereby the content of ice is relatively low. By means of a centrifugal pump, the ice content is increased by pumping the dispersion at low flow rate in the circular path, while a volume flow of water is withdrawn from the pipeline via an integrated screen pipe whereby the withdrawn volume flow of water is equal to the volume flow of the ice/water dispersion fed from the vacuum-ice machine, and is returned to the vacuum-ice machine. When the desired ice content is reached, the pump output is increased until the desired flow velocity for the test is realized. The increase of the ice content of the dispersion is however rather limited because the output of a centrifugal pump progressively deteriorates as the ice content, i.e. solids content, rises. Thus, this conventional test plant is unsuitable for efficient and economical hydraulic transport of bulk material from a receiving site to a remote location.

European Pat. No. 0,194,498 B1 describes a process and apparatus for clocked hydraulic transport of a turbid medium. The apparatus includes a reservoir for turbid medium with associated feed pump, a storage tank for liquid with associated fluid pump, a plurality of parallel metering chambers and a conveying pipeline. These components of the apparatus are connected to one another by conduits which can be shut off individually. The feed pump draws turbid medium from the reservoir to alternately fill the metering chambers in opposition to the conveying direction with turbid medium, whereby part of the liquid components of the turbid medium is withdrawn by suction by a jet pump via a compression chamber, which is associated to the metering chamber and provided with a screen, and conducted to the storage tank. In this manner, the solids concentration can be increased. By changing the position of the shut-off valves in the conduits, the turbid medium content is subsequently pressed from the metering chamber in conveying direction into the conveying pipeline by means of a liquid stream withdrawn by the fluid pump from the storage tank. During subsequent renewed filling of the metering chamber with turbid medium in opposite direction, the liquid is forced out of the metering chamber back into the storage tank. In this process, only solids-free liquid is conducted through the fluid pump that generates the conveying pressure. Moreover, the feed pump for turbid medium generates only a low pressure and conveys the turbid medium with a solids content which is significantly smaller than the solids content of the turbid medium in the conveying pipeline. The implementation of this process is disadvantageous because of the need for a rather complicated apparatus as well as the clocked introduction of the medium stream into the conveying pipeline.

SUMMARY OF THE INVENTION

It is thus an object of the present invention to provide an improved process for hydraulic transport of bulk material, obviating the afore-stated drawbacks.

In particular, it is an object of the present invention to provide an improved and more economical process for hydraulic transport of bulk material from a receiving site to a remote location via a conveying pipeline.

These objects, and others which will become apparent hereinafter, are attained in accordance with the present invention by preparing a dispersion comprised of bulk material and a liquid, continuously conducting the dispersion into a feed pump having a suction side and a pressure side, with the pressure side being in communication with the entry into the conveying pipeline, and withdrawing a fraction of the liquid at a location between the pump and the entry into the conveying pipeline.

The present invention is based on the recognition that although numerous, heretofore pneumatically transported bulk material can also be conveyed hydraulically in the form of the dispersion, the pumps used for realizing the conveyance limit the solids content of the dispersion to a degree that is significantly below the level by which a dispersion can be transported over a prolonged distance through a conveying pipeline in a trouble-free and economical manner. In other words, the limitation of the solids content of the dispersion as a consequence of the rapidly decreasing lift of typical pumps when the solids content of the dispersion is high, would result in a transport of an unnecessarily large volume flow of liquid through the conveying pipeline. Thus, installation of conveying pipelines of inefficiently great nominal diameter would be required.

Unlike conventional processes, the present invention now teaches a concentration of the dispersion before entering the conveying pipeline which extends between the receiving site and the remote location. Thus, the conveying pipeline can be dimensioned with smaller nominal diameter while still maintaining a same flow rate of bulk material per hour.

In the event, bulk material is not yet present in the form of a dispersion, the dispersion is made preferably by continuously introducing a controllable stream of bulk material and a controllable amount of liquid into a tank which is associated with means to control the filling level. Suitably, the ratio of stream of bulk material and the amount of liquid is so controlled as to result in the formation of a dispersion with a solids content that promotes a most efficient operation of the utilized feed pump.

The withdrawn fraction of liquid can be returned again into the process for preparing the dispersion. For example, this fraction of the liquid can be fed back into a reservoir which supplies the controllable amount of liquid for preparation of the dispersion. It is certainly also possible to return the withdrawn fraction of liquid directly into the tank for preparation of the dispersion.

According to another feature of the present invention, the volume of the tank can be used as buffer volume to bridge temporary interruptions of the hydraulic transport of the bulk material flow and/or the amount of liquid fed to the tank. Thus, the tank assumes the function of a buffer storage.

According to still another feature of the present invention, the amount of the withdrawn fraction of liquid can be controlled in dependence of the filling level in the tank. In this manner, a self-controlling concentration of the dispersion downstream of the pump can be accomplished at least within reasonable limits. For example, a drop of the filling level in the tank signals a less than desired concentration of the dispersion because the flow rate of, for example, a centrifugal pump increases with decreasing solids content. In this case, it is advisable to increase the concentration downstream of the feet, by raising the amount of the withdrawn fraction of the liquid.

Preferably, the stream of bulk material and the amount of liquid being introduced into the tank, are controlled individually or commonly in dependence on the filling level in the tank. In particular, when changing the stream of bulk material and the amount of liquid together and at a same ratio, not only the filling level can be maintained constant but also the solids content and the concentration of the dispersion in the tank can be kept constant.

Advantageously, also the conveying capacity of the feed pump can be controlled in dependence on the filling level in the tank. This type of closed loop control of the filling level of the tank is particularly simple to implement.

According to another feature of the present invention, the conveying capacity of the feed pump can be controlled in particular by changing a bypass stream in a bypass connecting the pressure side with the suction side. The bypass stream may be controlled either in dependence on the filling level of the tank or in dependence on another parameter, e.g. the transport condition prevalent in the conveying pipeline, or the demand for bulk material at the remote location. In a similar fashion, although more complicated, the conveying capacity of the feed pump can also be controlled by altering the output of the pump drive.

The filling level of the tank can be readily controlled by splitting the withdrawn fraction of liquid into two partial flows, with one of the partial flows being conducted to the tank and controlled in dependence of the filling level in the tank.

To optimize or also control the transport conditions in the conveying pipeline, the bulk material content in the dispersion, or the pressure of the dispersion, or the volume flow of the dispersion, can respectively be controlled to a preset level downstream of the feed pump. Suitably, the respective variable can be controlled by changing the withdrawn fraction of the liquid defined as the manipulated variable. In this manner, e.g. a clogging of the conveying pipeline can be avoided through rapidly decrease of the withdrawn fraction of liquid and associated rapid drop of the concentration of the dispersion.

In the event, the dispersion of bulk material and liquid has a very low solids content upstream of the pump for technological reasons, the conveying capacity of the feed pump is more efficiently exploited when controlling the amount of bulk material in the dispersion upstream of the feed to approximately a preset level that enables an optimum run of the pump. Equally possible and appropriate for economical reasons is a concentration of the dispersion between the tank for preparing the dispersion and the feed pump, whereby a further portion of liquid is withdrawn between the tank and the feed pump. Especially in situations where the concentration is prone to substantial fluctuations upstream of the pump, it may also be advisable to control the amount of the further withdrawn portion of liquid to a preset level.

BRIEF DESCRIPTION OF THE DRAWING

The above and other objects, features and advantages of the present invention will now be described in more detail with reference to the accompanying drawing, in which.

DETAILED DESCRIPTION OF PREFERRED EMBODIMENTS

Figure 1:
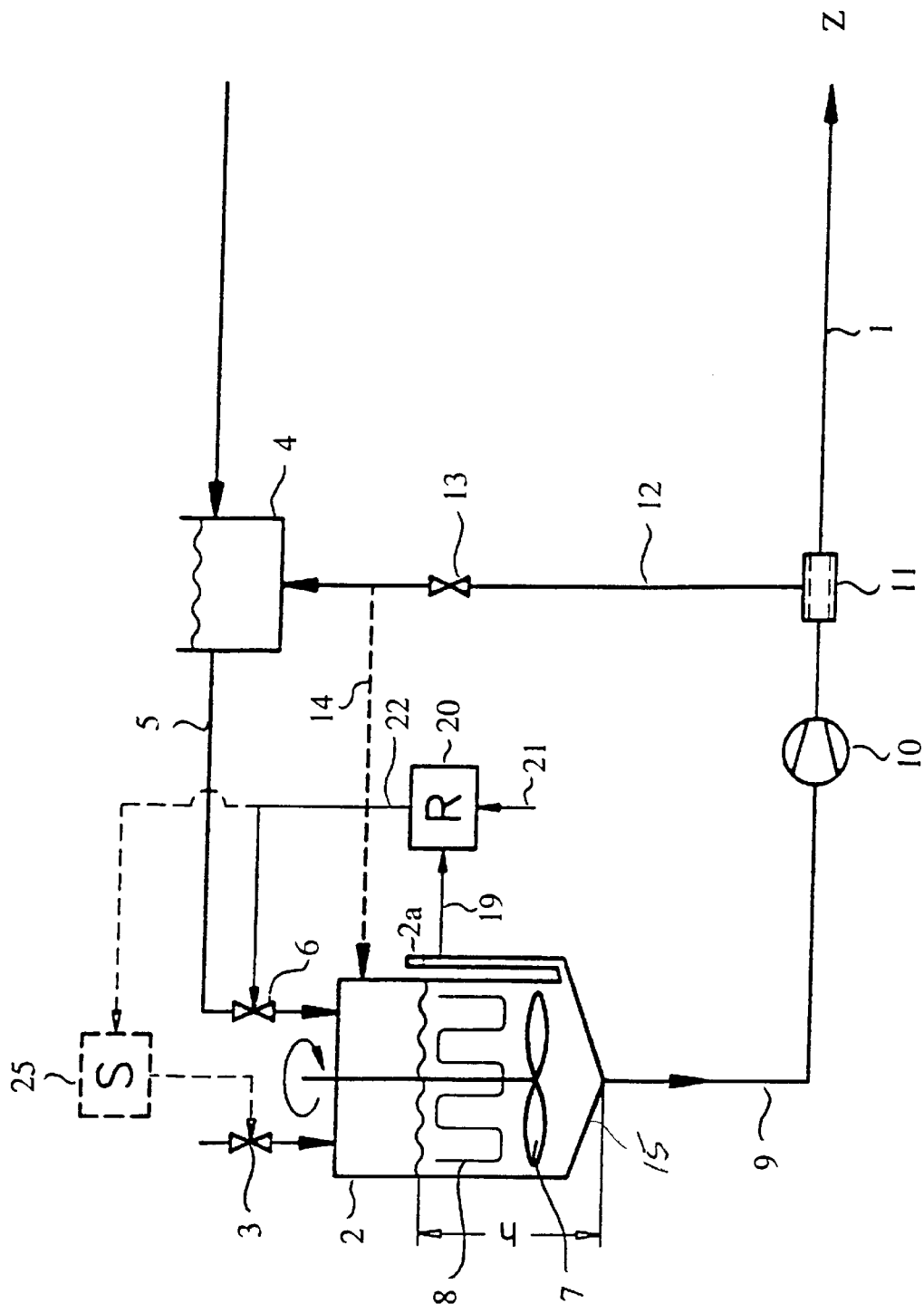
FIG. 1 is a schematic illustration of a first embodiment of an apparatus according to the present invention for hydraulic transport of bulk material.

Throughout all the Figures, same or corresponding elements are generally indicated by same reference numerals.

Turning now to the drawing, and in particular to FIG. 1, there is shown a schematic illustration of a first embodiment of an apparatus according to the present invention for hydraulic transport of bulk material, with the apparatus being located at the receiving site of bulk material to be conveyed hydraulically along a conveying pipeline 1 to a remote location Z. The apparatus includes a tank 2 which is filled to a filling level h with a dispersion of bulk material and a liquid, e.g. water. Introduction of bulk material into the tank 2 is realized in controlled quantities by a suitable metering device, for example, a rotary feeder. The required amount of liquid is drawn from a reservoir 4 and introduced into the tank 2 via a conduit 5 through suitable operation of a controllable gate 6. Accommodated in the tank 2 is a schematically illustrated agitator 7 and a schematically illustrated conditioning unit 8, for example, heating coil.

The tank 2 has a conical bottom 15 formed with an outlet which communicates via a conduit 9 with the suction side of a feed pump 10, e.g. a centrifugal pump. The pressure side of the feed pump 10 is connected via a screen pipe 11 with the entry into the conveying pipeline 1 that leads to the remote location Z. By means of the screen pipe 11 a fraction of the liquid is separated and withdrawn from the dispersion of bulk material and liquid to thereby concentrate the dispersion. Persons skilled in the art will understand that the screen pipe may certainly be substituted by any device that operates in a comparable manner to withdraw part of the liquid from the dispersion. The fraction of liquid withdrawn by the screen pipe 11 is reclaimed by the system by returning it via a conduit 12 into the reservoir 4, whereby a control valve 13 is disposed in the conduit 12 to regulate the liquid flow therethrough. Persons skilled in the art will understand that the conduit 12 may certainly be so configured as to lead directly into the tank 2, as indicated by dashed line 14. Also the dashed line 14 representing a conduit section may serve as branch line which branches off the conduit 12 downstream of control valve 13 and is provided in addition to the conduit 12 which discharges into the reservoir 4, as shown in FIG. 1.

The filling level h of the tank 2 is monitored, as indicated by reference numeral 2a, by a conventional measuring device which transmits a signal commensurate with the actual filling level h to the actual value input 19 of a controller 20. A desired value for the filling level h is inputted at input 21 into the controller 20 which compares the actual value and the desired value to generate at output 22 an actuating signal which is transmitted to the gate 6. In this manner, fluctuations of the filling level h are compensated by increasing or decreasing the supply of liquid from the reservoir 4 into the tank 2. This change of the supplied amount of liquid leads to a normally negligible decrease or increase of the concentration of the dispersion in the tank 2. These fluctuations of the concentration may however be avoided altogether by sending the actuating signal of the controller 20, as indicated by dashed line, to an optional control circuit 25, indicated by dash dot line. Through provision of the control circuit 25, the bulk material flow being supplied is increased or decreased via the metering device 3 in proportional ratio to the respective change of the introduced quantity of liquid.

Figure 2:
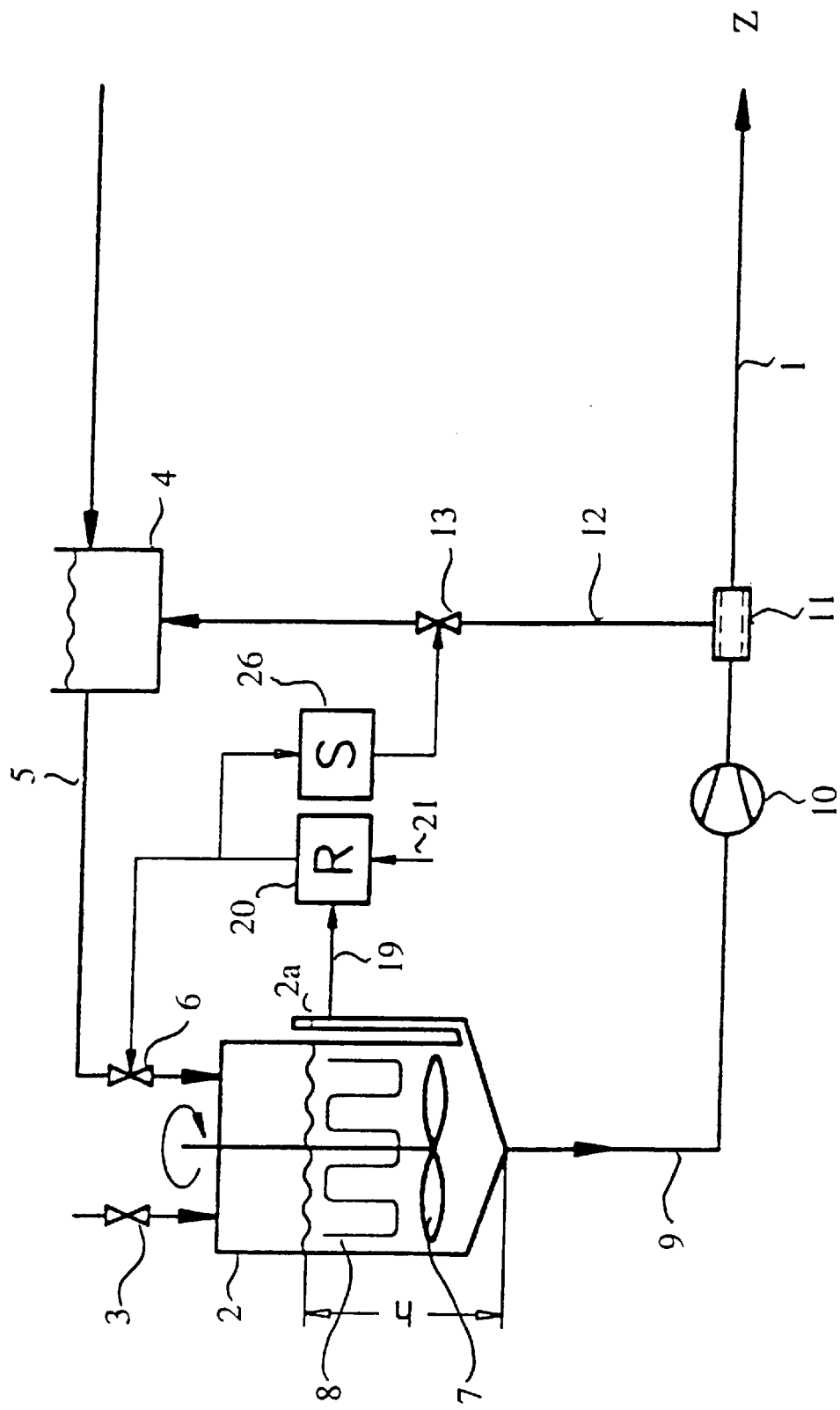
FIGS. 2 to 8 respectively illustrate further embodiments of the apparatus showing various modified control systems.

In the embodiment shown in FIG. 2, the apparatus differs from the configuration of FIG. 1 in the provision of a control circuit 26 which receives the actuating signal of the controller 20 to form a further actuating signal for regulating the control valve 13 in the conduit 12. As the controller 20 increases the supplied amount of liquid via the gate 6 when the filling level h falls in the container 2, the concentration of the dispersion drops on the suction side of the pump 10. Therefore, the control circuit 26 sends a signal to the control valve 13 for opening the valve 13 so as to increase the volume flow of the withdrawn fraction of liquid in the conduit 12 to thereby raise the concentration of the dispersion when entering the conveying pipeline 1 to the desired level.

Figure 3:
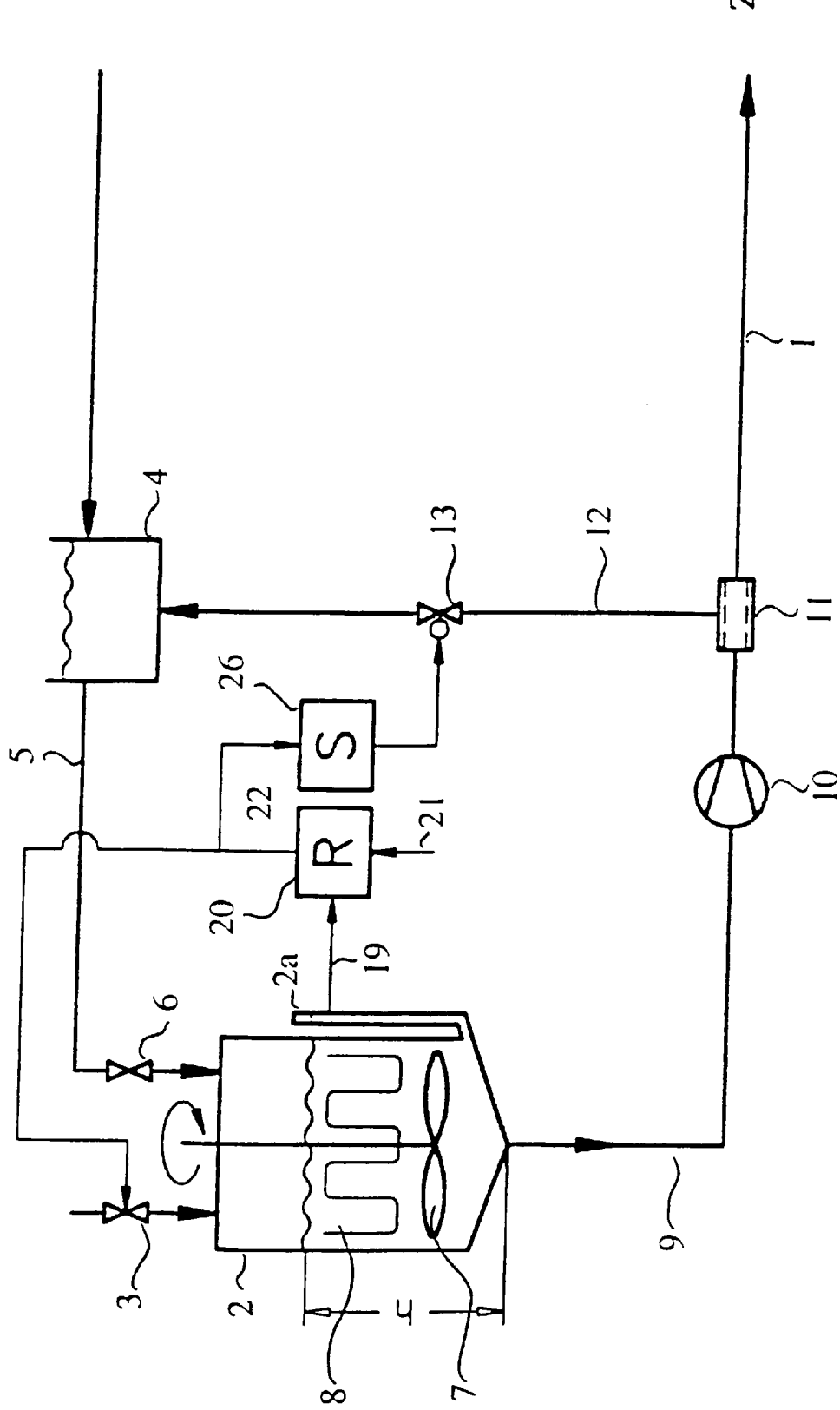

In the embodiment of FIG. 3, the actuating signal of the controller 20 is transmitted, instead to the gate 6, to the metering device 3, which means that the filling level h in the tank 2 is kept constant by re-adjusting the bulk material flow. At the same time, the actuating signal is transmitted to the control circuit 26 which now adjusts the control valve 13 in closing direction when the filling level h in the tank 2 drops, and thus changes the volume flow of the withdrawn fraction of the liquid in the conduit 12 in opposite direction to the adjustment of the metering device 3, as indicated by the symbolic illustration of a circle at the control valve 13.

Figure 4:
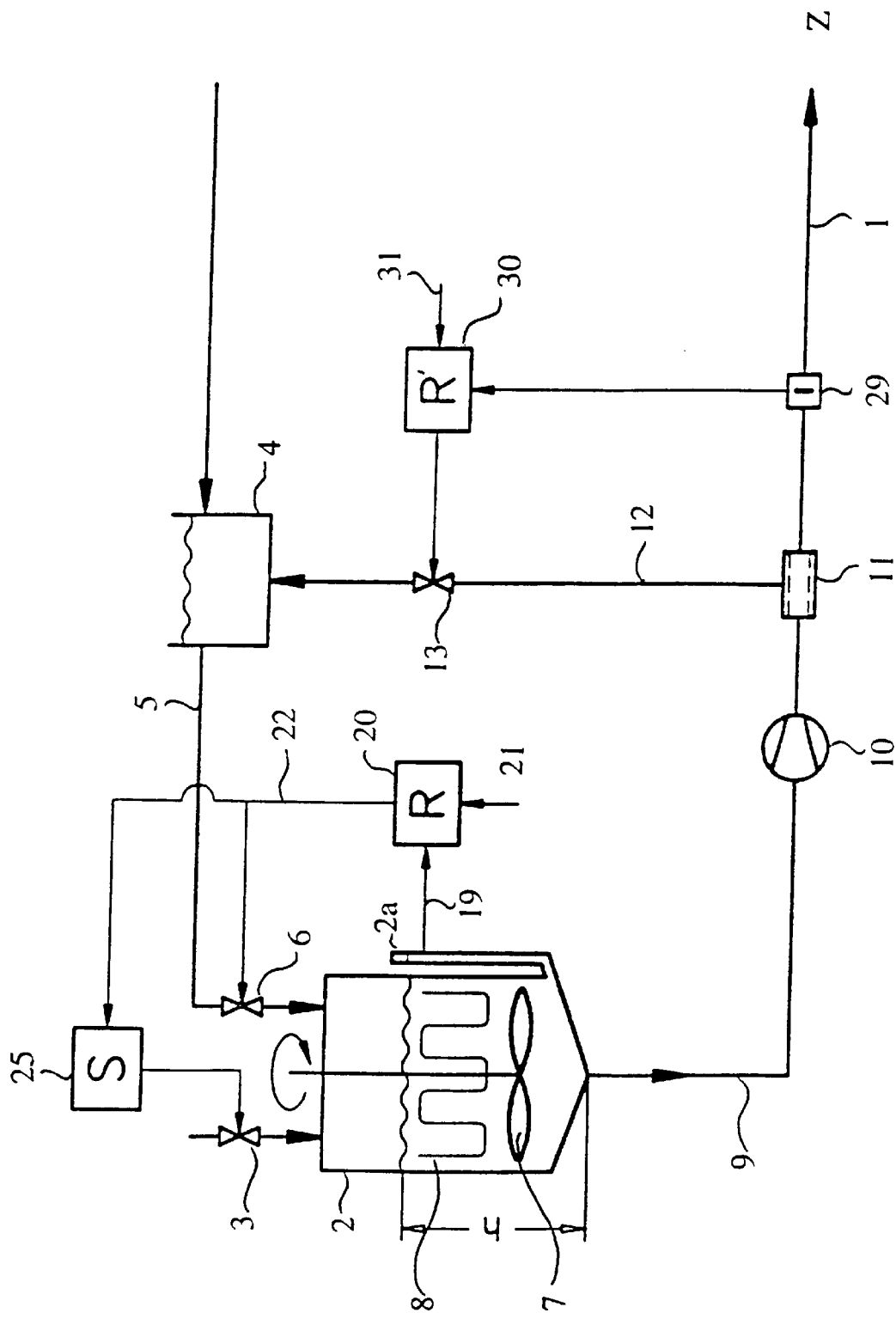

FIG. 4 shows an embodiment which substantially corresponds to the configuration of FIG. 1, including the provision of the control circuit 25, with the difference residing in the incorporation of a further closed loop control for influencing the conveying conditions in the conveying pipeline 1. This additional closed loop control includes a measuring unit 29 which selectively measures the granulate content, or the volume flow of the dispersion, or the pressure at the beginning of the conveying pipeline 1, and generates a commensurate signal for transmission to the controller 30. The controller 30 receives at input 31 the desired value or command variable and so adjusts the control valve 13 as to maintain the actual value, as monitored by the measuring device 29, as close as possible to the desired value or command variable. Persons skilled in the art will understand that the operation of the measuring unit 29, i.e. for which measurement the measuring unit 29 is designed, depends on the needs at hand. If, for example, the maximum conveying capacity of the hydraulic conveying pipeline 1 should be exploited to a greatest possible extent, the measuring unit 29 is so designed as to measure and control the volume flow of the dispersion or the pressure. The command variable of the controller 30 may certainly also be derived from a parameter at the remote location Z. Although not shown in the drawing, in this case, the actuating signal of the controller 30 may further also be used to change the conveying capacity of the feed pump 10.

Figure 5:
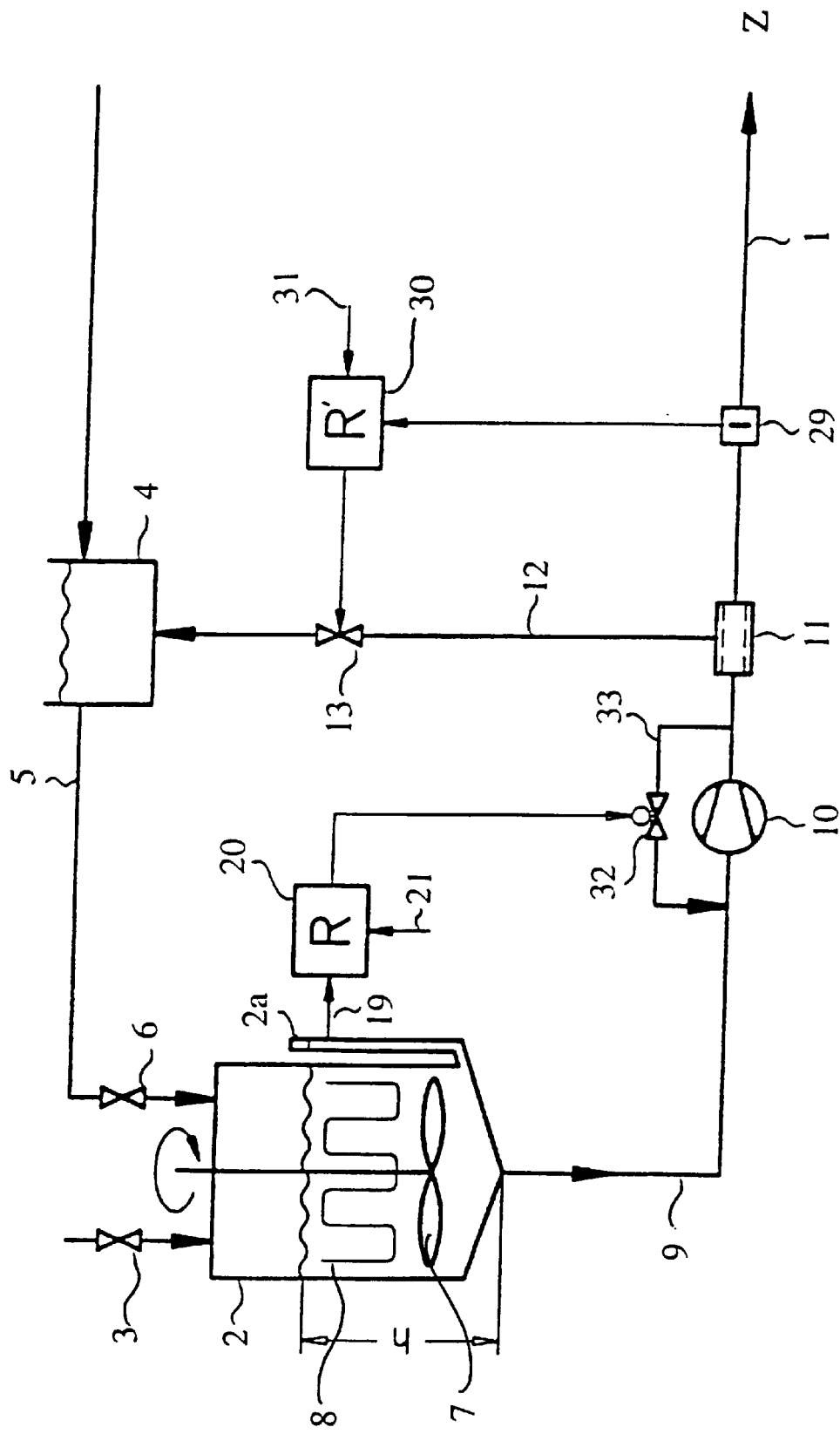

FIG. 5 shows an embodiment of the apparatus in which the actuating signal of the controller 20 is used to control the conveying capacity of the feed pump 10 in dependence on the filling level h of the tank 2. In the nonlimiting example of FIG. 5, the control is realized by adjustment of a bypass valve 32 which is disposed in a bypass line 33 that connects the pressure side of the pump 10 with the suction side thereof. If, for example, the filling level h drops, the controller 20 causes an opening of the bypass valve 32 to reduce the volume flow through the conduit 9.

Figure 6:
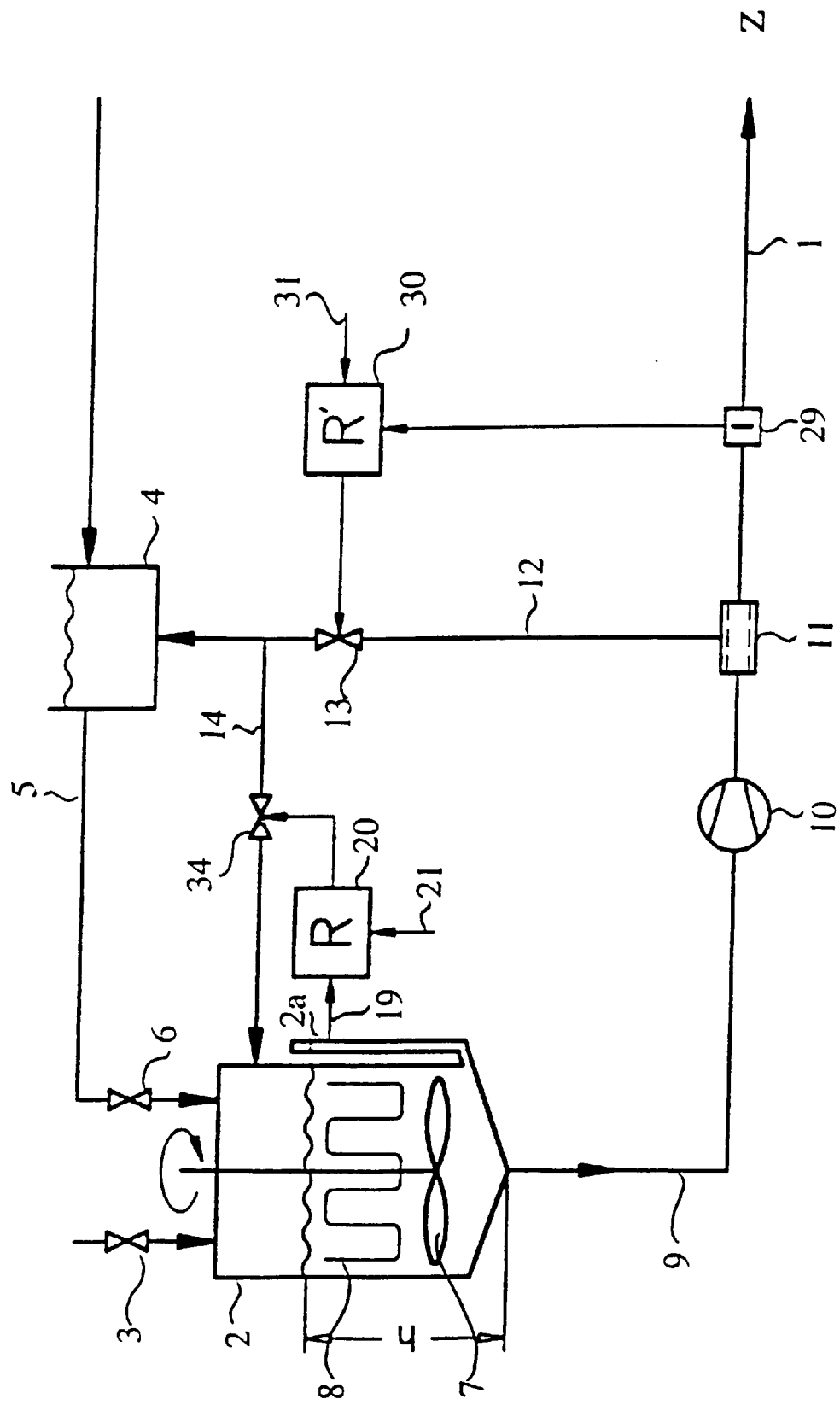

In FIG. 6, the actuating signal of the controller 20 is transmitted to a control valve 34 which is disposed in the branch 14 through which a part of the volume flow of withdrawn liquid from the conduit 12 is fed back directly into the tank 2. When the bulk material stream introduced into the tank 2 via the metering device 3 and the amount of liquid introduced via the gate 6 are substantially constant, the filling level h can be maintained constant simply by controlling the amount of liquid supplied through the conduit 14. Thus, the control valve 34 can be used as manipulating element which is substantially smaller than the gate 6.

Figure 7:
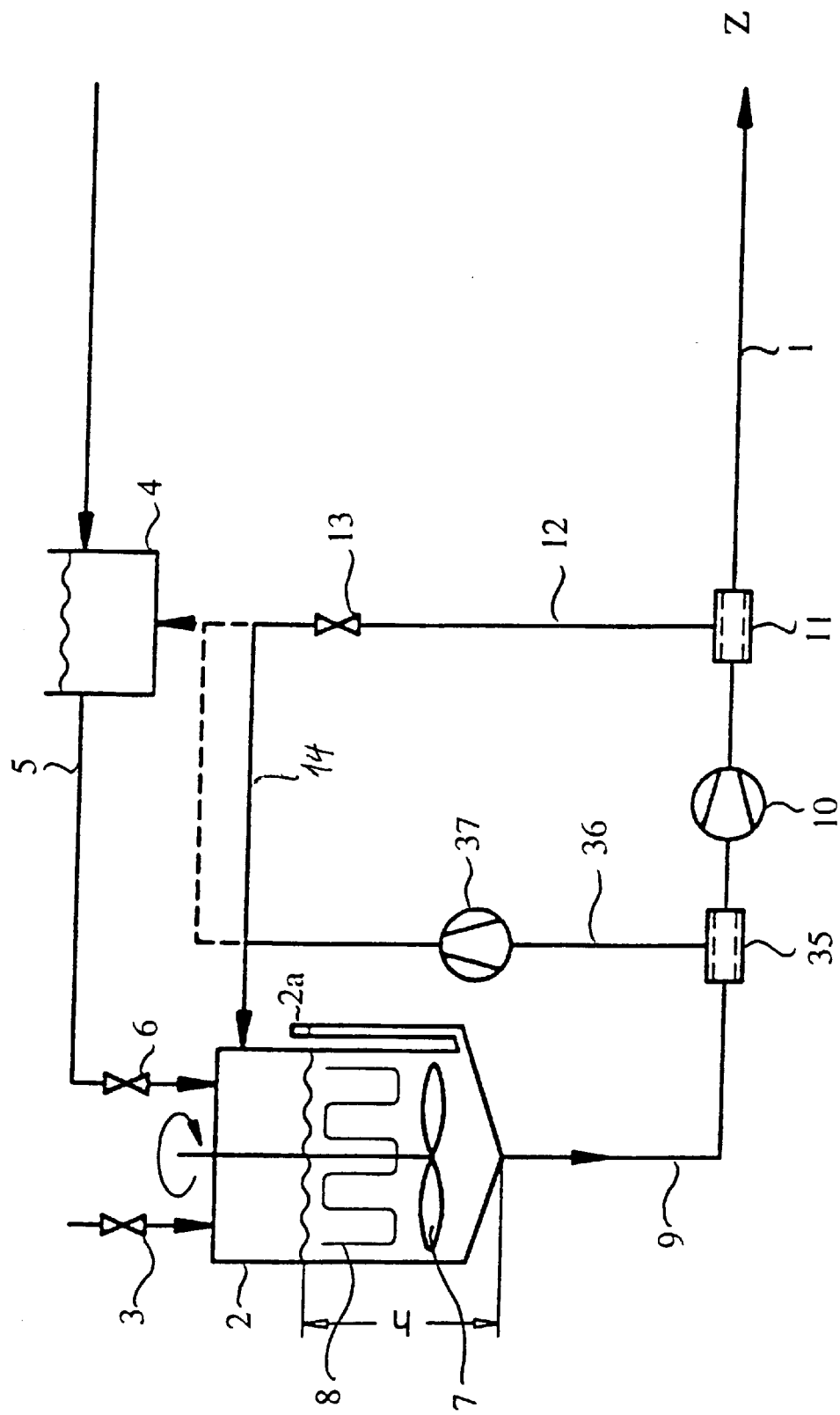

FIG. 7 illustrates an embodiment of the apparatus which is advantageous when the concentration of the dispersion in the conduit 9 is significantly lower than the concentration that the feed pump 10 is capable for transport in an economical manner. The tank 2 should be considered only as a symbolic representation because a dispersion with a lower bulk material content may be provided as a result of a preceding process, e.g. a granulating process. In this case, a further screen pipe 35 is arranged in the conduit 9 upstream of the feed pump 10 for withdrawing a portion of the liquid from the dispersion upstream of the feed pump 10, with the withdrawn portion of liquid being conducted through a conduit 36. As the dispersion normally flows in the conduit 9 in a substantially pressureless manner, a further pump 37 is needed in the conduit 36. The conduit 36 may either be connected with the branch 14, or, as indicated by dashed line, with the conduit 12. The dual concentration realized by the screen pipes 11, 35 has the advantage that the feed pump 10 as well as the conveying pipeline 1 can be operated in optimum manner or at nearly optimal conditions.

Figure 8:
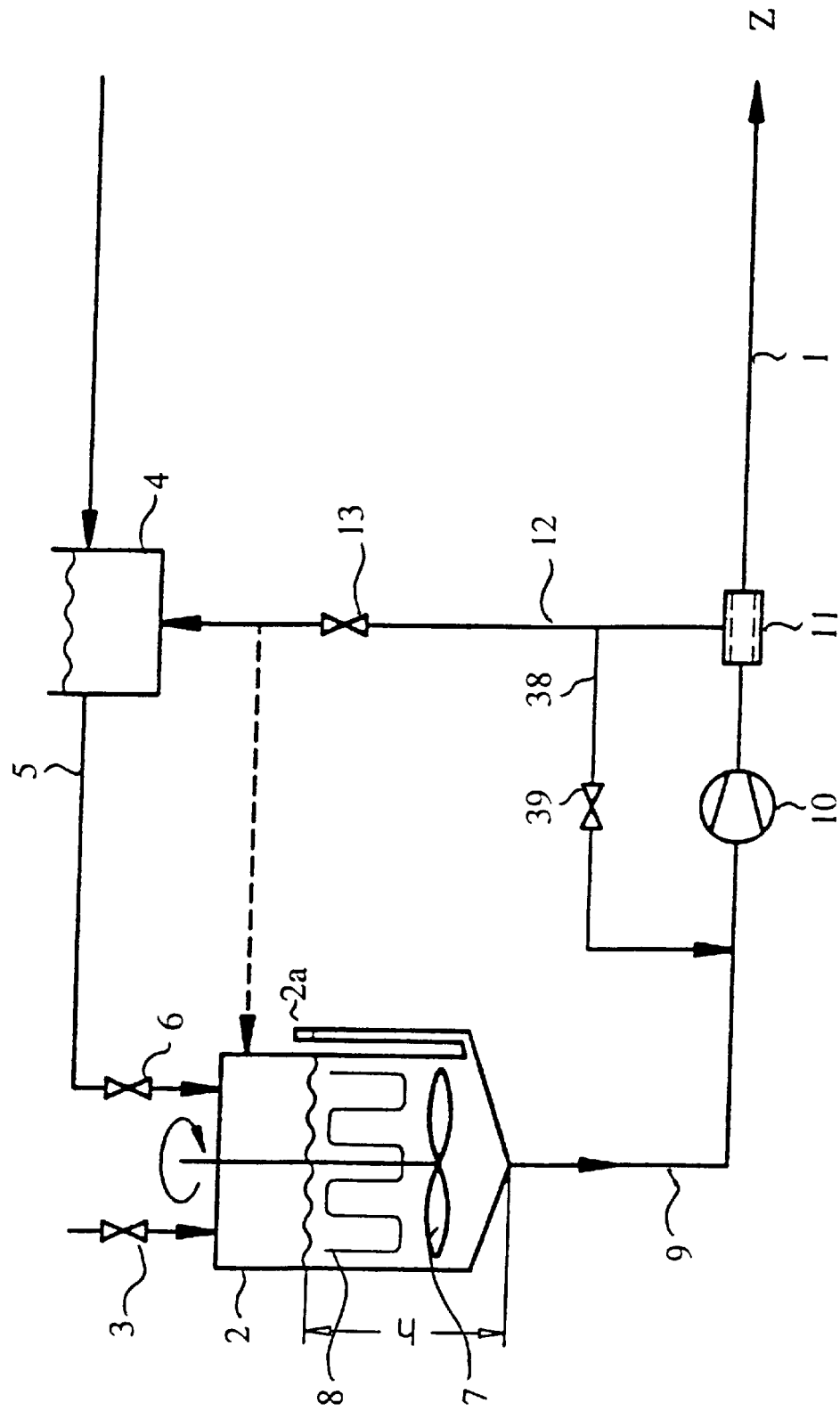

FIG. 8 shows an embodiment of the apparatus in which a bypass conduit 38 branches off the conduit 12, with a controllable valve 39 being disposed in the bypass conduit 38. The bypass conduit 38 is connected to the conduit 9 on the suction side of the feed pump 10. In this manner, the bulk material concentration can be lowered upstream of the feed pump 10 if, as a result of the process, the concentration in the conduit 9 is higher than would be compatible with the feed pump 10.

While the invention has been illustrated and described as embodied in a process for hydraulic transport of bulk material, it is not intended to be limited to the details shown since various modifications and structural changes may be made without departing in any way from the spirit of the present invention.

What is claimed as new and desired to be protected by Letters Patent is set forth in the appended claims:

What is claimed is:

1. A process for hydraulic transport of bulk material from a receiving site to a remote location via a conveying pipeline; comprising the steps of:
   preparing a dispersion of bulk material and a liquid;
   continuously conducting the dispersion into a feed pump having a suction side and a pressure side, with the pressure side being in communication with the entry into conveying pipeline; and
   withdrawing a fraction of the liquid at a location between the pump and the entry into the conveying pipeline.

2. The process of claim 1 wherein said preparing step includes continuously introducing a controlled stream of bulk material and a controlled amount of liquid into a tank, and controlling a filling level of the dispersion in the tank.

3. The process of claim 2 wherein the withdrawing step includes controlling the withdrawn fraction of liquid in dependence on the filling level in the tank.

4. The process of claim 2, and further comprising the step of controlling the stream of bulk material and the amount of liquid being introduced into the tank, individually or commonly, in dependence on the filling level in the tank.

5. The process of claim 2, and further comprising the step of controlling the conveying capacity of the feed pump in dependence on the filling level in the tank.

6. The process of claim 2, and further comprising the step of splitting the withdrawn fraction of liquid into two partial flows, with one of the partial flows being conducted to the tank and controlled in dependence on the filling level in the tank.

7. The process of claim 1, and further comprising the step of reclaiming the withdrawn fraction of liquid for preparing the dispersion.

8. The process of claim 1 wherein the tank has a volume used as buffer volume.

9. The process of claim 1, and further comprising the step of controlling the conveying capacity of the feed pump by changing a bypass stream in a bypass connecting the pressure side with the suction side.

10. The process of claim 1, and further comprising the step of interrogating a controlled variable of the dispersion and feeding the controlled variable to a controlling system.

11. The process of claim 10 wherein the controlled variable is the amount of bulk material in the dispersion, and further comprising the step of so controlling the amount of bulk material in the dispersion as to maintain a preset level downstream of the feed pump.

12. The process of claim 10, wherein the controlled variable is the pressure of the dispersion, and further comprising the step of so controlling the pressure of the dispersion as to maintain a preset level downstream of the feed pump.

13. The process of claim 10, wherein the controlled variable is the volume flow of the dispersion, and further comprising the step of so controlling the volume flow of the dispersion as to maintain a preset level downstream of the feed pump.

14. The process of claim 10 wherein the withdrawn fraction of the liquid constitutes a manipulated variable, and further comprising the step of controlling the controlled variable by changing the withdrawn fraction of the liquid.

15. The process of claim 1, and further comprising the step of so controlling the amount of bulk material in the dispersion as to maintain a preset level upstream of the feed pump.

16. The process of claim 1, and further comprising the step of withdrawing a further portion of liquid at a location between the tank and the feed pump.

17. The process of claim 16, and further comprising the step of so controlling the amount of the further withdrawn portion of liquid as to maintain a preset level.

* * * * *